Figure 1:
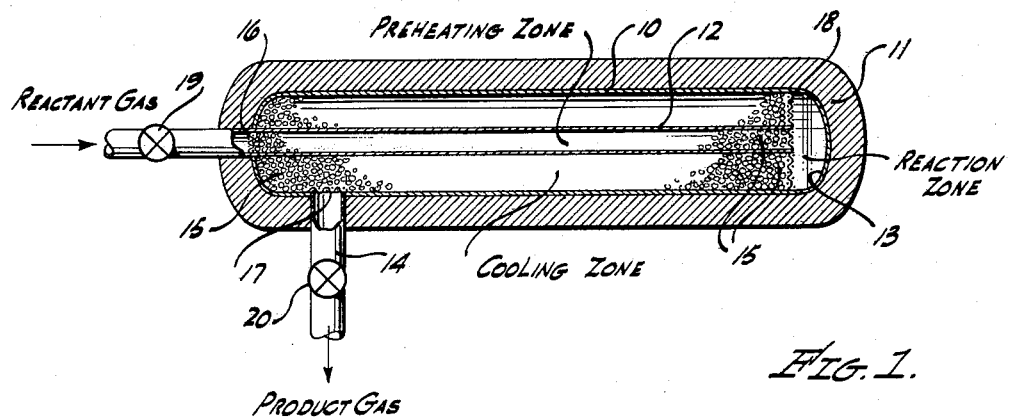

Sept. 20, 1955  A. C. McKINNIS  2,718,457

PRODUCTION OF HYDROGEN CYANIDE

Filed June 11, 1951

INVENTOR.
ART C. McKINNIS,
BY
Richard C. Norton
ATTORNEY.

2,718,457
Patented Sept. 20, 1955

2,718,457

PRODUCTION OF HYDROGEN CYANIDE

Art C. McKinnis, Long Beach, Calif., assignor to Union Oil Company of California, Los Angeles, Calif., a corporation of California Application June 11, 1951, Serial No. 232,935

12 Claims. (Cl. 23—151)

This application relates to the production of hydrogen cyanide, and in particular concerns an improved method and apparatus for the production of hydrogen cyanide by reaction between a hydrocarbon, oxygen and ammonia at high temperatures.

The commercial production of hydrogen cyanide is for the most part carried out by effecting reaction between methane, oxygen, and ammonia at elevated temperatures in the presence of a platinum catalyst. Such process secures relatively high conversions of ammonia to hydrogen cyanide, but is otherwise unsatisfactory since it requires the use of expensive catalysts which are subject to a certain amount of loss and degeneration over a period of time. Also, the effective catalysts are very sensitive to poisoning, thereby requiring that the reactants be employed in a highly purified form.

It has also been proposed to carry out the reaction noncatalytically at relatively high temperatures. As heretofore practiced, however, the non-catalytic process is thermally inefficient and requires the use of relatively large reactors. Also, the amount of ammonia converted to hydrogen cyanide is at best only about 55 per cent of theoretical.

It is accordingly an object of the present invention to provide an improved process for the production of hydrogen cyanide from hydrocarbons, oxygen and ammonia.

Another object is to provide a non-catalytic hydrogen cyanide process which is thermally efficient and which secures high conversions of ammonia to hydrogen cyanide.

A further object is to provide an improved apparatus for effecting the reaction between a hydrocarbon, oxygen and ammonia to form hydrogen cyanide.

Other objects will be apparent from the following detailed description of the invention, and various advantages not specifically referred to herein will be apparent to those skilled in the art upon employment of the invention in practice.

I have now found that the above and related objects may be realized in a process whereby a suitably proportioned reactant gas comprising a hydrocarbon, oxygen and ammonia is passed through a packed preheating zone into a free space reaction zone wherein reaction takes place at a relatively high temperature to form a hydrogen cyanide-containing hot product gas, and then passing said hot product gas through a packed cooling zone which is so positioned with respect to the preheating zone that the hot product gas passing through the cooling zone is cooled by transfer of heat to the reactant gas passing through the preheating zone. More particularly, I have found that in the production of hydrogen cyanide from a reactant gas mixture comprising a hydrocarbon, oxygen and ammonia, important operating advantages and good conversion of ammonia to hydrogen cyanide may be realized through the use of an apparatus in which one or more preheating tubes or conduits, which are filled or packed with a particulate substantially chemically and physically inert heat-conducting material and which communicate directly with a confined free space high temperature reaction chamber, are positioned within an elongated product gas cooling chamber which is likewise filled or packed with a particulate substantially chemically and physically inert heat-conducting material and which likewise communicates directly with said free space reaction chamber. The term "particulate substantially chemically and physically inert heat-conducting material" is employed herein and in the appended claims to define a particulate solid material which has heat-conducting properties and which of itself effects no substantial change in the composition of the gas with which it comes in contact. Thus, the term excludes catalysts and absorbents which would change the composition of such gas by chemical action, and also excludes adsorbents which effect such a change through a physical action. The reactant gas passes through the packed preheating conduits, wherein it becomes heated to a suitable preheat temperature substantially solely by transfer of heat through the walls of the conduits from the hot product gas passing through the cooling chamber, and then passes into the reaction chamber where the reaction takes place in confined free space. The direction of flow of the gas is then reversed, and the hot product gas passes through the packed cooling chamber along the outside of the preheating conduits and is cooled by transfer of heat through the walls of said conduits to the reactant gas passing through said conduits in the opposite direction. Such apparatus and mode of operation permits a maximum conservation of heat and secures conversions of ammonia to hydrogen cyanide of as high as 75 per cent, which are comparable to the conversions attained in the catalytic process. By reason of its high thermal efficiency, the present process permits relatively high gas velocities and short residence time within the reactor so that high production capacity can be attained in relatively small-size apparatus. By filling or packing the preheating conduits and cooling chamber with a particulate heat-conducting material, relatively large diameter preheating conduits may be employed and the length of the preheating conduits and cooling chamber may be reduced, thereby further decreasing the size and simplifying construction of the apparatus required.

Figure 2:
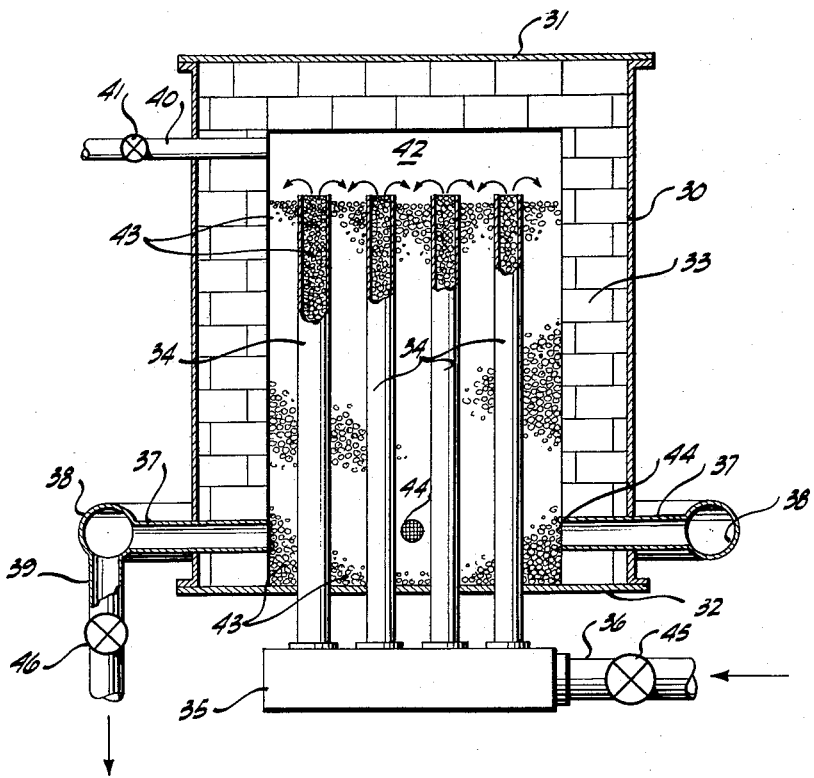

The nature and advantages of the invention will be more clearly understood by reference to the accompanying drawing which forms a part of this specification. In said drawing, Figure 1 is a cross-sectional view of a simple reactor illustrating the principle of the invention. Figure 2 is a cross-sectional view of a larger apparatus adapted for commercial use.

Referring now to Figure 1, the apparatus comprises a closed cylindrical vessel 10 surrounded by thermal insulation 11 and internally provided with a concentric tube 12 which functions as a reactant gas inlet and preheating zone. Within vessel 10, tube 12 terminates at a point relatively adjacent to end wall 13 of vessel 10. The free space between the termination of tube 12 and end wall 13 of the vessel constitutes a confined free space reaction zone. An outlet conduit 14 for removing the product gas is provided near the end vessel 10 which is opposite the reaction zone. The annular space between tube 12 and the sidewalls of vessel 10 constitutes a product gas cooling zone extending from the reaction zone back to outlet 14, and that portion of tube 12 which extends beyond outlet conduit 14 constitutes the preheating zone for the reactant gas. The preheating and cooling zones are both filled with a particulate heat-conducting material 15 retained in place by screens 16 and 17 which extend across inlet tube 12 and outlet conduit 14, respectively, and by screen 18 which extends across vessel 10 approximately in the plane of the end of tube 12. The reactant gas is introduced into tube 12 at a rate controlled by valve 19 and passes through the packed preheating zone wherein it is preheated by transfer of heat through the walls of tube 12 from hot product gas passing through the cooling zone. The preheated reactant gas passes from tube 12 into the free space of the reaction zone wherein reaction occurs with the formation of a hot product gas. The latter reverses its direction of flow and passes through the packed cooling zone wherein it is cooled by transfer of heat through the walls of tube 12 to the reactant gas passing therethrough. The cooled product gas is withdrawn from the reactor through outlet conduit 14 at a rate controlled by valve 20 and is passed to storage means, not shown.

While the reactor just described in connection with Figure 1 illustrates the principle upon which the invention is based, and may satisfactorily be employed for the manufacture of hydrogen cyanide on a small scale, it will be apparent to those skilled in the art that the reactor may take a variety of different forms adapted for larger-scale operation. Figure 2 illustrates one such form of large-scale reactor.

Referring now to Figure 2, the reactor therein shown takes the form of a square or cylindrical furnace comprising a metal shell 30 having roof and floor closures 31 and 32, respectively. The walls and top of the furnace are lined with firebrick or other refractory lining 33. If desired the floor of the furnace may also be refractory-lined. A plurality of preheating tubes 34 arranged in a square or circular pattern extend upwardly through the floor closure 32 and terminate within the furnace in a plane somewhat below that of the furnace roof. Exterior of the furnace, preheating tubes 34 are joined in a common header 35 which is provided with a reactant gas conduit 36. A plurality of product gas outlets 37 positioned near the floor of the furnace communicate with an exterior manifold 38 which is provided with a product gas conduit 39. Line 40 controlled by valve 41 is provided near the roof of the furnace and is supplied with a combustible fuel for the purpose of providing an auxiliary flame in reaction zone or chamber 42 which occupies the space between the ends of preheating tubes 34 and the roof of the furnace. The preheating tubes and the furnace are filled up to the level of the tube openings with a particulate heat-conducting material 43. Outlets 37 are covered by a screen or other perforate material 44 to retain the heat-conducting particles within the furnace. The portion of the furnace surrounding preheating tubes 34 constitutes a cooling zone or chamber for the hot product gas.

The reactant gas is introduced into the reactor from inlet conduit 36 at a rate controlled by valve 45, and passes into header 35 wherein it is distributed equally to preheating tubes 34. During passage of the gas through the preheating tubes it is heated by transfer of heat through the walls of tubes 34 from the hot gas which is flowing in the opposite direction through the cooling zone. The preheated reactant gas discharges from the preheating tubes directly into the free space of reaction zone 42 wherein reaction occurs to form a hot hydrogen cyanide-containing product gas. By suitably controlling the composition and velocity of the reactant gas as hereinafter more fully explained, the reaction can be made self-sustaining once steady-state conditions have been attained, and no heat need be supplied to the reactor from exterior sources. During start-up, however, the reaction is initiated and maintained by an auxiliary flame fed by a combustible fuel mixture introduced into line 40. Within a very short period of time after its formation within reaction zone 42, the hot product gas reverses its direction of flow and passes downwardly through the furnace along the outside of preheating tubes 34. During such passage the hot product gas is cooled by transfer of heat through the walls of tubes 34 to the reactant gas passing therethrough. The cooled product gas passes from the furnace through outlets 37 into manifold 38, and is thence sent to storage via conduit 39 controlled by valve 46.

Considering now the operating variables of the process of the invention in detail, the reactant gas consists essentially of a proportioned mixture of a hydrocarbon, oxygen and ammonia. A wide variety of hydrocarbons is suitable, but best results are obtained with non-aromatic hydrocarbons, particularly those which are normally gaseous or liquid and boil below about 600° F. at atmospheric pressure. The term "non-aromatic hydrocarbon" is herein employed as a generic term including saturated and unsaturated aliphatic and cycloaliphatic hydrocarbons but excluding aromatic or benzenoid hydrocarbons. The normally gaseous saturated aliphatic hydrocarbons, particularly methane and natural gas, are especially preferred by reason of their low cost and ease of handling. Hydrocarbon mixtures, e. g., mixed refinery gases and various petroleum distillates are also suitable. When employing a liquid hydrocarbon reactant, it is preferably vaporized prior to its admixture with the oxygen and ammonia reactants and/or prior to being preheated, although if desired such vaporization may be effected as part of the preheating step.

The oxygen reactant is usually provided in the form of air, but if desired oxygen-enriched air or even substantially pure oxygen may be employed. Air is of course preferred by reason of its lack of cost. The ammonia is usually provided in substantially pure form, but may be employed in admixture with nitrogen, hydrogen or other normally incident impurities. One of the features of the present process is its operability with relatively impure reactants.

The composition of the reactant gas may be varied considerably depending upon the identity of the hydrocarbon reactant. In general, between about 0.3 and about 1.0, preferably between about 0.5 and about 0.9, mole of oxygen and between about 0.1 and about 1.0, preferably between about 0.2 and about 0.5, mole of ammonia are provided per mole of carbon in the hydrocarbon reactant. When the reactant gas comprises a mixture of methane or natural gas, air and ammonia, it preferably comprises between about 15 and about 25 per cent by volume of the methane or natural gas, between about 65 and about 80 per cent by volume of air, and between about 3 and about 10 per cent by volume of ammonia. A reactant gas consisting of air, natural gas and ammonia in a volume ratio of 15:4:1 has been found eminently satisfactory.

The reaction temperature is in general maintained between about 1000° C. and about 1700° C., with the optimum temperature within this range depending upon other operating variables, e. g., reactant gas composition, rate of flow through the reactor, pressure etc. In order that the reaction may be self-sustained, i. e., carried out without the addition of heat from exterior sources, the reactant gas should have a preheat temperature between about 600° C. and about 1500° C., preferably between about 900° C. and about 1300° C. As herein employed, the term "preheat temperature" refers to the temperature of the reactant gas at the point within the reactor where it passes from the packed preheating zone into the confined free space reaction zone. Such temperature provides a somewhat more convenient source of control than the higher reaction temperature, and accordingly the process is usually controlled by adjusting the reactant gas composition and velocity so as to secure the desired preheat temperature.

The reaction time, i. e., the residence time of the reaction gas within the confined free space reaction zone is usually between about 0.01 and about 0.1, preferably between about 0.02 and about 0.06, second. Within this range the optimum value varies inversely with the reaction temperature, i. e., shorter reaction times are employed at the higher reaction temperatures and vice versa. Such time can of course be controlled by varying the rate of gas flow through the reactor, but since the preheat temperature likewise varies with such rate of flow it is preferable that the reaction time should be determined for the most part by the volume of the reaction zone. Accordingly, the reactor is preferably constructed to have a reaction chamber of such capacity that the desired reaction time is attained at approximately the same rate of gas flow that permits achieving the desired preheat temperature.

The velocity at which the reactant gas is passed through the preheating zone and into the reaction zone depends somewhat upon the composition of the reactant gas and the desired preheat temperature. Ordinarily, however, such velocity is between about 1 and about 15 linear feet per second calculated at standard conditions of pressure and temperature.

As previously stated, filling or packing the preheating and cooling zones with a particulate heat-conducting material permits the use of relatively large diameter and short length preheating conduits. Where the preheating and cooling zones are unpacked it has been found that the length of such zones should be from about 25 to 35 times the diameter of the preheating conduits. Thus, unpacked preheating conduits 2 inches in diameter should have a length coextensive with the cooling zone of about 50 to 70 inches. However, it is desirable that the product gas be cooled as quickly as is consistent with efficient transfer of heat to the reactant gas, i. e., the residence time within the cooling zone should be relatively short. Accordingly, the length of the cooling zone should not be too great. At gas velocities which permit attainment of the desired preheat temperature, the cooling zone is most suitably about 2 to 20 inches long. By so limiting the length of the cooling zone (and consequently the length of the preheating zone) the diameter which the preheating conduits may take is limited to about 0.06 to 0.5 inch and is preferably about 0.125 inch. Unpacked reactors are thus characterized by being limited to the use of relatively small diameter preheating conduits.

I have found, however, that by packing or filling the preheating and cooling zones with a particulate substantially chemically and physically inert heat-conducting material the ratio between the length of these zones and the diameter of the preheating conduits may be reduced to between about 3/1 and about 8/1. Thus, packed preheating conduits 2 inches in diameter need be only about 10 to 16 inches long, and satisfactory conversion of ammonia to hydrogen cyanide can be attained with preheating conduits of this diameter or larger. Usually, it is preferred that the preheating conduits be from about 0.5 to about 2 inches in diameter. Packing the preheating and reaction zones thus permits commercial size reactors of the type illustrated by Figure 2 to be constructed with a relatively small number of short-length preheating conduits of relatively large diameter, in contrast to unpacked reactors which require a large number of longer small-diameter preheating conduits and which are consequently more difficult and costly to construct. Stated alternatively, packing the preheating and cooling zones as herein described results in improved conversions of ammonia to hydrogen cyanide and permits a reduction in the length of said zones. In a typical operation carried out under optimum conditions of gas velocity, temperature, reaction time and reactant gas composition with an unpacked reactor of the general type illustrated in Figure 1 in which the preheating conduit was 0.5 inch in diameter and 14 inches long, the conversion of ammonia to hydrogen cyanide was about 60 per cent. When the operation was repeated in a reactor in which the 0.5 inch preheating conduit was only about 3 inches long and the preheating and cooling zones were filled with $3/16''$ x $3/16''$ cylindrical Carborundum pellets, the conversion of ammonia to hydrogen cyanide was about 65 per cent.

A variety of materials may be employed for packing or filling the preheating and cooling zones, and while such materials must be able to withstand temperatures of the order of 500° C. to 1500° C. they need not be refractory in the sense of being able to withstand extremely high temperatures. They should, however, have good heat-conducting properties and be incapable of effecting a change in the composition of the gas with which they come in contact. Temperature resistant metal alloys, as well as ceramic materials, such as sillimanite, porcelain, mullite, quartz, etc., may be employed. Carborundum has been found highly satisfactory. The particle size may be varied considerably, but usually corresponds to about 1–20 mesh depending upon the cross-sectional area of the preheating and cooling zones. Since the packing should remain fixed within the reactor it should not be so finely-divided as to be carried along with the gas stream. Various shapes may be employed, e. g., spheres, cylinders, etc., but in order to minimize the pressure drop through the packed zones shapes having low packing factors are most desirable. Cylindrical pellets, $3/16$ x $3/16$ inch, have been found very suitable for use in packing 0.5–1.0 inch preheating conduits, with larger size pellets being employed for large conduits.

As will be apparent to those skilled in the art, many variations in the design and construction of the apparatus and in the operation of the process are permitted within the scope of the invention. Usually, the reactor will comprise a plurality of preheating conduits positioned within a common cooling chamber. Regular geometric spacing of the conduits within the cooling chamber is preferred, and the effective cross-sectional area of the cooling chamber is preferably from 1 to 6 times the total cross-sectional area of the preheating conduits. Usually, the same material is employed for packing the preheating and cooling zones, but if desired these zones may be packed with different materials or with different sizes of the same materials. The preheating conduits may be disposed horizontally or vertically and may even oppose one another. The essence of the invention lies in the provision of a preheating zone comprising a confined fixed bed of a particulate substantially chemically and physically inert heat-conducting material, which zone communicates directly with a confined free space reaction zone which in turn communicates directly with a cooling zone comprising a confined fixed bed of a particulate substantially chemically and physically inert heat-conducting material, said cooling zone being in indirect heat exchange relationship with said preheating zone; and in passing the reactant gas successively through said zones under the conditions herein specified to effect the autothermic production of hydrogen cyanide.

The following example will illustrate one way in which the principle of the invention may be applied, but is not to be construed as limiting the same.

*Example*

The reactor employed is of the type illustrated in Figure 2 and comprises sixteen 0.5 inch quartz preheating tubes 6 inches long arranged in a square pattern within a 4 x 4 inch square furnace chamber. Within the furnace chamber, the preheating tubes terminate in a plane 0.5 inch below the furnace roof. The furnace and preheating tubes are filled to the level of the tube orifices with 3/16 x 3/16 inch carborundum pellets. The reactant gas consists of 75 per cent by volume of air, 20 per cent by volume of natural gas and 5 per cent by volume of ammonia, and is introduced into the preheating tubes at a feed rate of about 270 SCFH. After steady-state operation is attained the preheat temperature is about 1250° C., and the conversion of ammonia to hydrogen cyanide is about 65 per cent. The product gas has the following composition on a water-free basis:

| | Per cent by volume |
|---|---|
| Nitrogen and inerts | 62.3 |
| Hydrogen | 18.0 |
| Carbon monoxide | 11.1 |
| Carbon dioxide | 0.8 |
| Methane | 1.7 |
| Ethylene | 0.3 |
| Acetylene | 0.5 |
| Ammonia | 2.1 |
| Hydrogen cyanide | 3.2 |
| | 100.0 |

Other modes of applying the principle of my invention may be employed instead of those explained, change being made as regards the materials or apparatus employed, provided the steps or combination of elements stated by any of the following claims, or the equivalent of such stated steps or combination of elements be employed.

I, therefore, particularly point out and distinctly claim as my invention:

1. A process for the production of hydrogen cyanide which comprises passing a reactant gas mixture comprising a non-aromatic hydrocarbon having an atmospheric boiling point below about 600° F., oxygen and ammonia through a first elongated fixed bed of a particulate substantially chemically and physically inert heat-conducting material into a confined free space reaction zone wherein reaction occurs with the formation of a hydrogen cyanide-containing hot product gas, passing said hot product gas through a second elongated fixed bed of a particulate substantially chemically and physically inert heat-conducting material, effecting heat exchange between said first fixed bed and said second fixed bed whereby the reactant gas passing through said first fixed bed is heated to a temperature between about 600° C. and about 1500° C. substantially solely by indirect heat exchange with the hot product gas passing through said second fixed bed, and maintaining the residence time of the reacting gas within the reaction zone between about 0.01 and about 0.1 second.

2. A process for the production of hydrogen cyanide which comprises forming a reactant gas mixture comprising a normally gaseous saturated aliphatic hydrocarbon, between about 0.3 and about 1.0 mole of oxygen per mole of carbon in said hydrocarbon, and between about 0.1 and about 1.0 mole of ammonia per mole of carbon in said hydrocarbon; passing said mixture through a first elongated fixed bed of a particulate substantially chemically and physically inert heat-conducting material into a confined free space reaction zone wherein reaction occurs with the formation of a hydrogen cyanide-containing hot product gas; passing said hot product gas through a second elongated fixed bed of a particulate substantially chemically and physically inert heat-conducting material, said second fixed bed being in heat exchange relationship with said first fixed bed whereby the reactant gas passing through said first fixed bed is heated to a temperature between about 600° C. and about 1500° C. substantially solely by indirect heat exchange with the hot product gas passing through said second fixed bed; and maintaining the residence time of the reacting gas within the reaction zone between about 0.01 and about 0.1 second.

3. A process according to claim 2 wherein the hydrocarbon reactant is selected from the class consisting of methane and natural gas.

4. A process according to claim 2 wherein the oxygen reactant is in the form of air.

5. A process according to claim 2 wherein the said first fixed bed is subdivided into a plurality of substantially parallel elongated fixed beds and said second fixed bed is in heat-exchange relationship with each of the subdivisions of said first fixed bed.

6. A process for the production of hydrogen cyanide which comprises forming a reactant gas mixture comprising between about 15 and about 25 per cent by volume of a hydrocarbon selected from the class consisting of methane and natural gas, between about 25 and about 80 per cent by volume of air, and between about 3 and about 10 per cent by volume of ammonia; passing said reactant gas mixture through a first elongated fixed bed of a particulate substantially chemically and physically inert heat-conducting material into a confined free space reaction zone wherein reaction occurs with the formation of a hydrogen cyanide-containing hot product gas; and passing said hot product gas through a second elongated fixed bed of a particulate substantially chemically and physically inert heat-conducting material, said second fixed bed being in heat exchange relationship with said first fixed bed, the rate of flow of the reactant gas through said first fixed bed being maintained at a value such that said gas is heated therein to a temperature between about 600° C. and about 1500° C. substantially solely by indirect heat exchange with the hot product gas passing through said second fixed bed, and the residence time of the reacting gas within the reaction zone being maintained between about 0.01 and about 0.1 second.

7. A process for the production of hydrogen cyanide which comprises forming a reactant gas mixture comprising between about 15 and about 25 per cent by volume of a hydrocarbon selected from the class consisting of methane and natural gas, between about 25 and about 80 per cent by volume of air, and between about 3 and about 10 per cent by volume of ammonia; passing said reactant gas through a first confined elongated fixed bed of a particulate substantially chemically and physically inert heat-conducting material into a confined free space reaction zone wherein reaction occurs at a temperature between about 1000° C. and about 1700° C. with the formation of a hydrogen cyanide-containing hot product gas; reversing the direction of gas flow within said reaction zone; passing said hot product gas through a second confined elongated fixed bed of a particulate substantially chemically and physically inert heat-conducting material, said second fixed bed surrounding said first fixed bed in heat exchange relationship therewith; and removing cooled product gas from said second fixed bed; the rate of flow of the reactant gas through said first fixed bed being maintained at a value such that said gas is heated therein to a temperature between about 600° C. and about 1500° C. substantially solely by indirect heat exchange with the hot product gas passing in the opposite direction through said second fixed bed, and the residence time of the reacting gas in the reaction zone being maintained between about 0.01 and about 0.1 second.

8. The process of claim 7 wherein the first confined elongated fixed bed of particulate substantially chemically and physically inert heat-conducting material is between about 0.5 and about 2 inches in diameter and has a length from about 3 to about 8 times its diameter.

9. The process of claim 7 wherein the reactant gas passing through the first fixed bed is heated therein to a temperature between about 900° C. and about 1300° C. substantially solely by indirect heat exchange with the hot product gas passing through the second fixed bed.

10. The process of claim 7 wherein the residence time of the reacting gas within the reaction zone is between about 0.02 and about 0.06 second.

11. The process of claim 7 wherein the first fixed bed is between about 0.5 and about 2 inches in diameter and has a length from about 3 to about 8 times its diameter, and the reactant gas is passed through said bed at a linear velocity between about 1 and about 15 feet per second.

12. The process of claim 7 wherein the said first fixed bed is subdivided into a plurality of substantially parallel elongated fixed beds and the said second fixed bed surrounds each of the subdivisions of said first fixed bed and is in heat-exchange relationship therewith.

References Cited in the file of this patent

UNITED STATES PATENTS

| | | |
|---|---|---|
| 1,855,134 | Lheure | Apr. 19, 1932 |
| 1,982,407 | Wheeler | Nov. 27, 1934 |
| 2,069,545 | Carlisle | Feb. 2, 1937 |
| 2,135,695 | Bardwell | Nov. 8, 1938 |
| 2,431,632 | Brandt | Nov. 25, 1947 |
| 2,432,872 | Ferro | Dec. 16, 1947 |
| 2,530,274 | Weber | Nov. 14, 1950 |